(12) United States Patent
Sayer et al.

(10) Patent No.: US 9,634,941 B2
(45) Date of Patent: *Apr. 25, 2017

(54) REGIONAL INDEPENDENT TANDEM TELEPHONE SWITCH

(71) Applicant: LEVEL 3 COMMUNICATIONS, LLC, Broomfield, CO (US)

(72) Inventors: Christopher Sayer, Broomfield, CO (US); Rogier Ducloo, Portland, OR (US); Richard Terpstra, Superior, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/948,266

(22) Filed: Nov. 21, 2015

(65) Prior Publication Data

US 2016/0080270 A1    Mar. 17, 2016

Related U.S. Application Data

(63) Continuation of application No. 13/270,506, filed on Oct. 11, 2011, now Pat. No. 9,197,948.

(51) Int. Cl.
*H04L 12/803* (2013.01)
*H04L 12/853* (2013.01)
*H04Q 3/66* (2006.01)

(52) U.S. Cl.
CPC ........ *H04L 47/125* (2013.01); *H04L 47/2416* (2013.01); *H04Q 3/66* (2013.01); *H04Q 2213/13034* (2013.01); *H04Q 2213/13164* (2013.01); *H04Q 2213/13196* (2013.01);

(Continued)

(58) Field of Classification Search
CPC .......... H04Q 2213/13196; H04Q 2213/13383; H04Q 3/66
See application file for complete search history.

(56) References Cited

U.S. PATENT DOCUMENTS

| 6,681,232 B1 | 1/2004 | Sistanizadeh et al. |
| 6,697,475 B1 | 2/2004 | MeLampy et al. |
| 7,046,669 B1 | 5/2006 | Mauger et al. |

(Continued)

OTHER PUBLICATIONS

Extended European Search Report, dated Mar. 24, 2015, Application No. 12839964.9, filed Oct. 10, 2012; 7 pgs.

(Continued)

*Primary Examiner* — David Oveissi (57) ABSTRACT

Implementations of the present disclosure involve an apparatus and/or method for a regional independent tandem switch of a telecommunications network. The tandem switch processes communications between a long distance carrier and a local exchange carrier through a voice over IP (VOIP) network. By utilizing the VOIP network, the regionally independent tandem may process long distance communications to and from any point in the network, regardless of the physical proximity of the tandem to the originating/destination communication device. The regionally independent nature of the tandem also allows for flexibility in communication routing through the network, load balancing between the network tandem switches and reduction of needed components of the network for proper processing of the long distance communications.

10 Claims, 4 Drawing Sheets

(52) U.S. Cl.
CPC ............. *H04Q 2213/13383* (2013.01); *H04Q 2213/13389* (2013.01)

(56) References Cited

U.S. PATENT DOCUMENTS

| | | | |
|---|---|---|---|
| 8,275,112 B1* | 9/2012 | Kell | H04M 3/42238 |
| | | | 370/352 |
| 2003/0198216 A1 | 10/2003 | Lewis | |
| 2004/0022237 A1 | 2/2004 | Elliott et al. | |
| 2005/0226400 A1 | 10/2005 | Farber et al. | |
| 2008/0080684 A1* | 4/2008 | Scorza | H04Q 3/0062 |
| | | | 379/112.01 |
| 2008/0279354 A1* | 11/2008 | Terpstra | H04M 3/42306 |
| | | | 379/114.24 |
| 2009/0257428 A1 | 10/2009 | Brooks et al. | |
| 2011/0317820 A1* | 12/2011 | Torgersrud | H04M 3/4228 |
| | | | 379/88.09 |

OTHER PUBLICATIONS

International Preliminary Report on Patentability, dated Apr. 15, 2014, Int'l Appl. No. PCT/US12/059555, Int'l Filing Date Oct. 10, 2012; 8 pgs.
International Search Report dated Dec. 17, 2012, Appl. No. PCT/US12/59555, filed Oct. 10, 2012, 3 pgs.
Written Opinion, dated Dec. 17, 2012, Appl. No. PCT/US12/59555, filed Oct. 10, 2012, 6 pgs.

* cited by examiner

REGIONAL INDEPENDENT TANDEM TELEPHONE SWITCH

CROSS REFERENCE TO RELATED APPLICATIONS

This application is a continuation of, and claims the benefit of priority to, U.S. Non-Provisional application Ser. No. 13/270,506, titled "REGIONAL INDEPENDENT TANDEM TELEPHONE SWITCH," filed Oct. 11, 2011, which is hereby incorporated by reference herein.

TECHNICAL FIELD

Aspects of the present disclosure relate to telecommunication networks. More particularly, aspects of the present disclosure involve an apparatus, system and method for a tandem telephone switch of a telecommunications network capable of routing communications on the network to regionally diverse or co-located end customers or enterprises.

BACKGROUND

Tandems of a telecommunication network are a type of switch (also known as a Class 4 telephone switch) that are typically utilized to connect local exchange carriers that handle local communications to long distance carriers that handle long distance communications. To route long distance communications, tandems are typically dependent or dedicated to a particular region because such tandems are connecting directly to a plurality of local exchange carriers to route any long distance calls originating from or terminating at those local exchange carriers to the long distance carriers. As such, tandems provide transmission support for a particular sector or area of the telecommunications network. In other words, all long distance telephone calls or communications originating from or terminating in a particular region are routed through the tandem associated with that region. For example, a long distance call originating or terminating in Denver, Colo. is typically routed through a tandem associated with Denver or the Denver area. The dedication of a tandem to a region is typically accomplished by assigning an identification number or code, such as an area code, to a specific tandem in the telecommunications network. Any long distance communications with a particular area code associated with the communication will be routed through the tandem that is assigned to handle that particular area code. Similarly, any long distance communications originating from a particular area will be processed by the tandem associated with that area.

Figure 1:
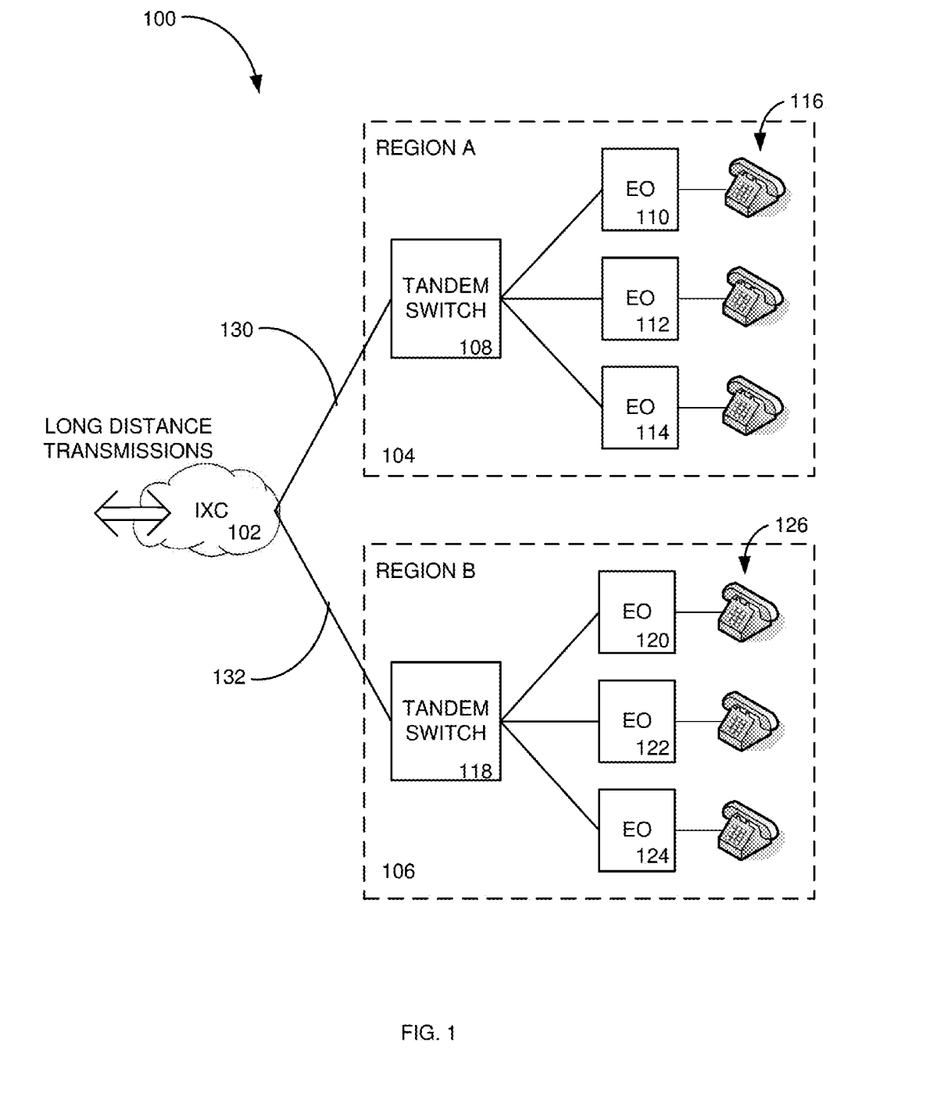
FIG. 1 is a diagram illustrating a telecommunications network utilizing regionally-specific tandems for routing communications through the network.

The operation of a regionally dependent tandem is provided herein with reference to the network depicted in FIG. 1. In this example, the tandem 108 of region A (104) is configured to process long distance communications originating from or terminating with the communicators 116 of region A. Similarly, the tandem 118 of region B (106) is configured to process long distance communications originating from or terminating in region B. To transmit a communication to the proper tandem switch, the interexchange carrier (IXC) 102 may be configured to determine the originating region and/or the terminating region of a communication transmitted on the telecommunication network. In one example, the communication may be associated with an identification code or other identifying mark that contains destination information for the communication. One such example of an identification mark is an area code and local number. This information may also be associated with a particular tandem switch of the network such that all communications that contain the identification number are routed to that particular tandem. For example, region A (104) may be assigned an identification number for all communications with the destination code of 303-777-xxxx, where "x" is any number. Similarly, region B (106) may be assigned the identification number for all communications with the destination code of 720-555-xxxx, where "x" is any number. In this example, any long distance communication that is directed toward a communication device assigned the 303-777 number is routed through the tandem 108 associated with region A (104) by the IXC 102. Similarly, any long distance communication that is directed to a communication device assigned the 720-555 number is routed through the tandem 118 associated with region B (106) by the IXC 102. In this manner, tandem switches associated with a particular region of the network are configured such that only those communications that share the identification number of the tandem are routed through that particular tandem switch.

Due to this region-specific nature of tandems, a telecommunication network may lack certain flexibility in routing communications through the network to account for complexities and vagaries within the communication network. For example, a disruption to the operation of a tandem may cause a disruption of all communications from and into an entire region supported by the network. In addition, many telecommunication providers utilize a separate internet protocol (IP) network for IP-based communications such that tandems (which are typically utilized in telephonic networks only) are typically unable to handle IP-type communications. Therefore, use of regionally specific tandems limits the effectiveness and flexibility of a telecommunications network.

Hence, among other things, there exists a need for advanced tandem devices and methods in telecommunications networks that provide flexibility in communication routing through the network and to generally de-regionalize the tandem switches.

SUMMARY

One implementation of the present disclosure may take the form of a method for transmitting a long distance communication on a telecommunications network. The method comprises the operations of receiving a long distance communication originating from a communication device associated with the telecommunications network and determining a status of a plurality of regionally independent tandem switches communicably connected to the telecommunications network, the plurality of regionally independent tandem switches associated with a voice over IP network and configured to receive and process long distance communications transmitted on the voice over IP network. Additionally, the method includes the operations of selecting at least one of the plurality of regionally independent tandem switches based on the status of the tandem switches and transmitting the long distance communication to the selected at least one of the plurality of regionally independent tandem switches.

Another implementation of the present disclosure may take the form of a system transmission of long distance communications. The system may comprise a plurality of regionally independent tandem switches, each tandem switch comprising and a routing device of a voice over IP (VOIP) network. Each tandem switch of the plurality of regionally independent tandem switches may comprise first interface operable to communicate with an interexchange carrier for transmission of a long distance communication. Further, the routing device of a voice over IP (VOIP) network comprises a tandem interface communicably connecting at least one of the plurality of regionally independent tandem switches to the VOIP network, a processor and a computer-readable device associated with the processor and including instructions stored thereon. The instructions are executable by the processor to receive a long distance transmission originating from a communicator associated with the VOIP network and determine a status of the at least one of the plurality of regionally independent tandem switches, where the status indicates an operational state of the at least one regionally independent tandem switch, the status including operational information about the at least one of the plurality of regionally independent tandem switches. The instructions are further executable to select the at least one of the plurality of regionally independent tandem switches based on the status of the at least one of the plurality of regionally independent tandem switches and transmit the long distance communication to the selected at least one of the plurality of regionally independent tandem switches.

Yet another implementation of the present disclosure may take the form of method for transmitting a long distance communication. The method may include the operations of receiving a long distance communication originating from a communication device associated with a telecommunications network and transmitting the long distance communication to at least one of a plurality of regionally independent tandem switches associated with a voice over IP network. In addition, the plurality of regionally independent tandem switches are communicably connected to a voice over IP network and are configured to receive and process any long distance communications transmitted on the voice over IP network originating from any of a plurality of communication devices associated with the voice over IP network.

DETAILED DESCRIPTION

Implementations of the present disclosure involve an apparatus, system and/or method for a regionally independent tandem switch of a telecommunications network. The tandem switch processes communications between a long distance carrier and a local exchange carrier through a communications network, such as a voice over IP (VOIP) network. In general, a regionally independent tandem may process long distance communications to and from any point in the network regardless of the physical proximity of the tandem to an originating/destination communication device. Thus, regionally independent tandems are not necessarily dedicated to a particular region to process long distance communications related to that region. Rather, regionally independent tandems may process any long distance communication of the network. The regionally independent nature of the tandem also allows for flexibility in communication routing through the network, load balancing between the network tandem switches and reduction of needed components of the network for proper processing of the long distance communications.

Tandems of a telecommunication network are a type of switch (also known as a Class 4 or Class 5 telephone switch) that are typically utilized to connect local exchange carriers that handle local communications to long distance carriers that handle long distance communications. Generally, a sector tandem switch connects local telephone exchanges and carries traffic within the local access and transport area (LATA). An access tandem switch connects local telephone exchanges to long-distance telephone companies. However, modern tandem switches typically act as both a sector tandem and an access tandem.

FIG. 1 is a diagram illustrating a telecommunications network utilizing regionally independent tandems (108,118) for routing communications through a network 100. The network 100 is a traditional network architecture that organizes the network into separate regions. However, in this example, the telecommunications network 100 may utilize regionally independent tandems in place of regionally dependent tandems to process the long distance communications into or out of each region. In general, the communication devices associated with region A (104) may be located near a specific geographic region and are identified by a common number or identifier, such as an area code or other portions of a telephone number. Region B (106) may have a similar structure in a region distinct from region A (104). As explained in more detail below, communications originating from either region are processed by the components associated with that region. In addition to the components shown, the network 100 may be merely a portion of an overall telecommunications network such that additional components and connections may be included in the network to transmit a communication through the network.

The network 100 includes a long distance communications network, otherwise known as an interexchange carrier (IXC) 102. Generally, the IXC is a telecommunications network that supports long distance communications between local access and transport areas (LATA) or local exchanges. For example, the IXC 102 is connected to two regions or local exchanges, namely region A (104) and region B (106). Communications transmitted within a region are typically handled by the local exchange for that particular region. For example, a communication between two communicators within region A (104) may be routed by a local exchange associated with region A. However, when a communication is to be routed between regions, the communication may be transmitted to the IXC 102 for the transmission to the destination region. In some configurations, the regions (104), (106) may be regionally distinct or collocated anywhere along the network. For example, region A (104) may be located in California while region B (106) may be located in Colorado. In general, however, the regions depicted in FIG. 1 may be separated by any distance.

To receive and transmit communications associated with the regions, the IXC 102 is connected or otherwise associated with regions A (104) and B (106), as well as other regions not shown. The IXC 102 is connected to a tandem switch that processes communications into or out of a region or is otherwise associated with the particular region. For example, region A (104) includes a tandem switch 108 that is directly connected to the IXC 102 via one or more trunk lines (130, 132) of the network 100. In other configurations, the tandem 108 may be connected to the IXC 102 through any number of network devices and components. In general, the tandem 108 and the IXC 102 transmit at least some communications being handled by the network 100 between the two components. In one particular embodiment, the IXC 102 may communicate with the one or more tandem switches with an IP network protocol, discussed in more detail below in relation to FIG. 2.

In addition to the IXC 102, the tandem (104) is connected to one or more local or end office switches (EO) 110-114 of the region. It should be appreciated that, while three EO switches 110-114 are shown in FIG. 1 for each region, any number of EO switches may be associated with or connected to the tandem 108 of the respective region. In general, the EO switches 110-114 of a region route communications to and between local customers of the region. As such, one or more communicators 116, such as telephones or other communication devices, may be connected to or otherwise associated with the EO switches 110-114. Further, while a single communication device is shown connected to each EO switch 110-114, it should be appreciated that any number of such devices may be connected to an EO switch to route communications through the network. Communication devices 116 may include, but are not limited to, a wired telephone, a cellular telephone, an audio enabled personal computer, an audio enabled personal digital assistant (PDA), a voice over internet protocol telephone, a video enabled wired telephone, a video enabled cellular telephone, a video enabled voice over internet protocol telephone, a video enabled personal computer, and/or a video enabled PDA. In general and as used herein, a communicator 116 can be a location (physical or logical) where a transmission is sent to/from, an entity associated with communications, and/or a communication device capable of receiving and/or sending such transmissions.

In addition, the components of the region described above may be connected in several ways. For example, the components may be directly connected as indicated in FIG. 1. In other examples, one or more additional components and devices of the network may be connected between the components shown. In general, any connection point shown in FIG. 1 may include any type of direct connection or indirect connection of a telecommunications network, including wired and wireless connections.

As also shown in FIG. 1, a similar configuration of the network of region A (104) may be replicated in a second region, named region B (106) in the Figure. Thus, region B (106) may include a tandem switch 118 connected to and communicating with the IXC 102 to route long-distance calls originating from or terminating at communication devices 126 in region B. Region B (106) may also include one or more EO switches 120-124 connected to the tandem switch 118 and one or more communication devices 126 connected to each EO switch 120-124 of the region. However, while the configuration of the network components of region A (104) and region B (106) are identical in FIG. 1, it should be appreciated that the configuration of the network devices may take any form in the separate regions of the network. For example, region B (106) may include more or fewer EO switches than region A (104). Further, each region may include any number of additional network components as part of the regional network to facilitate the transmission of communications across the local network. For clarity sake, however, the regional networks are shown to be similar and the number and type of components limited.

As mentioned above, a regionally dependent tandem of a region is configured to process only those long distance communications originating from or terminating within the region. However, the dedication of a tandem to a specific region of network may encourage several undesirable effects in the telecommunications network. For example, if the tandem assigned to a region fails or becomes otherwise inoperable, long distance communications intended for that region may not be properly routed to the destination communication device. Also, an unusual high volume of communications to one particular region may overwhelm the assigned tandem such that the transmission speed of the telecommunications network is thereby reduced. In general, the tandem for any particular region may act as a bottleneck for long distance communications routed to/from that region where any number of problems may arise.

Figure 2:
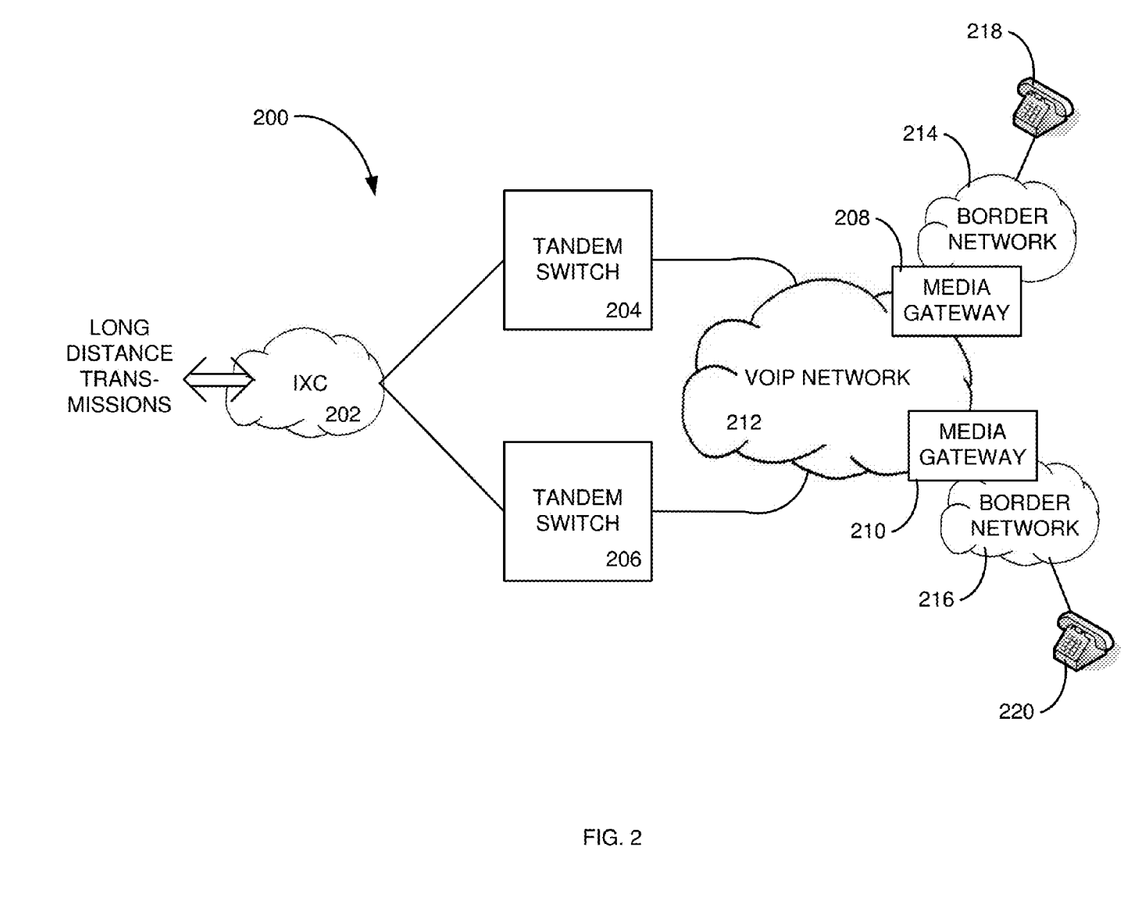
FIG. 2 is a diagram illustrating a telecommunications network utilizing regionally-independent tandems for routing communications through the network.

Regionally independent tandems, on the other hand, may process long distance communications from anywhere on the network, providing greater flexibility and robustness to the communications network. Thus, by utilizing regionally independent tandems in the network configuration 100 of FIG. 1, the flexibility of communication processing by the network may be increased. For example, FIG. 2 illustrates an alternate configuration of a Voice Over IP (VOIP) telecommunications network that addresses the potential bottleneck problem of regionally specific tandem switches. More particularly, FIG. 2 is a diagram illustrating a telecommunications network utilizing regionally-independent tandems for routing communications through the network. The regionally-independent tandems of the telecommunications network of FIG. 2 may provide added flexibility in the transmission of the communications through the network to avoid potential problems that exists with the use of regionally dependent tandem switches.

Similar to the network of FIG. 1, the network 200 depicted in FIG. 2 includes an IXC 202 that transmits long distance communications between local carriers. In general, the IXC 202 of FIG. 2 operates in a similar manner as the IXC explained above with reference to FIG. 1. Also similar to the network of FIG. 1, the IXC 202 of FIG. 2 may be connected to one or more tandem switches (204, 206) to facilitate the transmission of communications between local carriers and the IXC. However, unlike the tandems of FIG. 1, the tandem switches (204, 206) of the network 200 of FIG. 2 may be interconnected between the regions of the network such that any communication on the network may be processed by either of the tandem switches. In one embodiment, the IXC 202 may communicate with the tandem switches (204, 206) using an IP protocol recognizable by an voice over IP network, discussed in more detail below. The advantages of the regionally independent nature of the tandem switches (204, 206) of the network 200 are discussed in more detail below.

To further connect the IXC 202 to one or more local carriers, the tandem switches (204, 206) are connected to a voice over IP (VOIP) communications network 212 configured to transmit communications across the VOIP network. In general, the VOIP network 212 may include one or more routers and switches capable of routing various transmissions across the VOIP network. As such, long distance communications or transmissions originating/terminating at a local carrier may be transmitted through the VOIP network 212 to/from one or more tandem switches (204, 206) connected to the VOIP network.

One or more IP media gateways (208, 210) included with one or more border networks (214, 216) may also be connected to the VOIP network 212. As used herein, an IP media gateway can be any microprocessor based machine used to control and/or protect the border of an IP network and an adjoining network. Thus, as just one example, an IP media gateway can be a session border controller. Border networks (214, 216) can be any network capable of connecting one or more communicators (218, 220) with VOIP network 212 via an IP media gateway 208, 210. Thus, border networks can include Wi-Fi points, Internet Service Provider (ISP) networks, public switched telephone networks (PSTN), enterprise networks, virtual private networks (VPN), and/or the like. As used herein, the term "connected to" is used to mean any type of coupling whereby information can be passed between two or more points, including wired and/or wireless communication. In another example, the components may be directly connected as indicated in FIG. 2. In yet other examples, one or more additional components and devices of the network may be connected between the components shown. In general, any connection point shown in FIG. 2 may include any type of direct connection or indirect connection of a telecommunications network.

In operation, a long distance communication may be initiated from communicator 218, for example. The transmission is received at border network 214 and directed to VOIP network 212 via IP media gateway 208. The transmission indicates that the communication is a long distance communication for transmission over the IXC 202. Thus, the transmission is communicated via VOIP network 212 to one of the available tandem switches 204, 206 and, subsequently, onto the IXC 202 for long distance communication to the destination of the communication.

Based on the disclosure provided herein, one of ordinary skill in the art should appreciate that two or more communicators can be associated with a border network, and that any communications passing between such communicators can be passed through the border network using the common IP media gateway or switch incorporated into the border network. Other alternatives are also possible in accordance with the present disclosure. In general, any type of VOIP or cloud-based network may be utilized with the regionally independent tandem switches (204, 206) for transmission of long distance communications between a local carrier and the IXC 202.

The use of the VOIP network 212 allows for an alternate implementation of regionally independent tandem switches in a communications network which provides several advantages and flexibility for the network in routing long distance transmissions to and from the IXC 202. In general, the tandem switches 204, 206 of the network 200 may be independent of a region such that any communication on the network may be processed by the tandem switches, not just communications of a specific region. As described above, a conventional tandem switch is assigned an identification number for all communications with the destination code for communicators connected to that tandem switch. Thus, a single tandem switch must process each long distance communication for a particular region.

In contrast, the cloud-based nature of the telecommunications VOIP network 212 of FIG. 2 allows the tandem switches (204, 206) associated with the VOIP network flexibility to process any communication transmitted on the network. In general, one or more regionally independent tandem switches (204, 206) may be used to process long distance communications from the VOIP network 212. This is due, in part, because communications on the VOIP network 212 are generally transmitted or processed in an IP format or packets for transmission across the VOIP network. Thus, any communication on the VOIP network 212 may be transmitted and processed at any other location on the network, regardless of the originating location. This is in contrast to other telecommunication networks that limit the processing of communications into specific regions based on the wiring of the network. As such, the network of FIG. 2 removes the need for a group of components dedicated to a specific region for supporting transmissions into and out of that region. Instead, the regionally independent tandems may process long distance communications from any communicator on the network.

In application, the regionally independent nature of the tandems (204, 206) of the network 200 of FIG. 2 allows the IXC 202 to transmit long distance communications to any tandem associated with the VOIP network 212. Thus, IXC 202 may transmit a received long distance communication to either tandem 204 or tandem 206 for transmission through the network 212 to the destination communicators (218, 220). The capability of long distance communications to be processed by any tandem associated with the network provides several advantages.

For example, as explained above, one drawback to a regionally dependent tandem switch is that all communications transmitted into or from a region must be processed by the assigned tandem. Thus, an unusual high volume of long distance communications through that region may overwhelm the tandem switch such that communications may be slow or be lost entirely. This may occur despite the availability of other tandem switches on the network being below capacity due to long distance communications in those other regions being lower than usual. However, by employing one or more regionally independent tandem switches, the IXC 202 or VOIP network 212 may route long distance communications to a selected tandem switch such that no tandem switch of the network is overwhelmed. The load balancing of the communications between the tandems of the network 212 is possible since the long distance communications on the VOIP network 212 are not limited to a particular regional tandem switch. One method for load balancing between a plurality of tandem switches of a network is described in more detail below with reference to the method of FIG. 3.

Other advantages may also be realized through the use of regionally independent tandem switches. For example, in a traditional configuration, the failure of a tandem switch for any reason may result in a complete shutdown of all long distance communications to the region supported by that tandem switch. For example, because all communications from a region must be processed by a regionally dependent tandem switch, a malfunction in the tandem switch would prevent any long distance communications from being processed into or out of the region. In contrast, in the network 200 of FIG. 2, the IXC 202 or VOIP network 212 may route long distance communications to any tandem switch connected to the IXC or the VOIP network. For example, in tandem switch 204 malfunctions, long distance communications may be routed by the IXC 202 to tandem switch 206 for the transmission of the long distance communications to the communicators (218, 220). Similarly, the VOIP network may also detect that tandem switch 204 is malfunctioning and route all communications to tandem switch 206. In this manner, the regionally independent tandem switches (204, 206) may account for a malfunctioning switch in the network 200 such that little to no effect is noticed by the users of the telecommunications network.

Additionally, telecommunication networks that utilize regionally independent tandem switches may reduce the overall number of tandem switches associated with the telecommunications network. As mentioned above, traditional tandem switches are regionally specific and are, thus, typically located near the region the tandem supports. To provide tandem switches for a large area consisting of many regions, several tandem switches are needed as each region requires a tandem located nearby. Alternatively, telecommunication networks that utilize regionally independent tandems may include fewer tandems as such tandems are not required to be located near any particular region. In general, a regionally independent tandem may replace any number of regionally specific tandems to reduce the complexity and cost of the telecommunications network. Further, because a communication on such a network may be processed by any tandem, the need for redundant or backup tandems is also reduced.

In addition, while not shown in FIG. 2, one or more end office switches (EO) may be connected to or otherwise associated with the border networks (214, 216) of the network 200 such the EO may also be regionally independent. This is due to the regionally independent nature of the VOIP network 212 described above that provides for the regionally diversification of components associated with network. Connecting one or more EO switches to the VOIP network 200 allows local carriers to connect to the tandem switches (204, 206) of the network, as well as to other local carriers in a regionally independent manner. The regionally independent nature of the VOIP network 200 removes the necessity of the EO switches to connect to every regional tandem and, instead, can connect to a small set of switches, reducing the cost of implementing the network.

Figure 3:
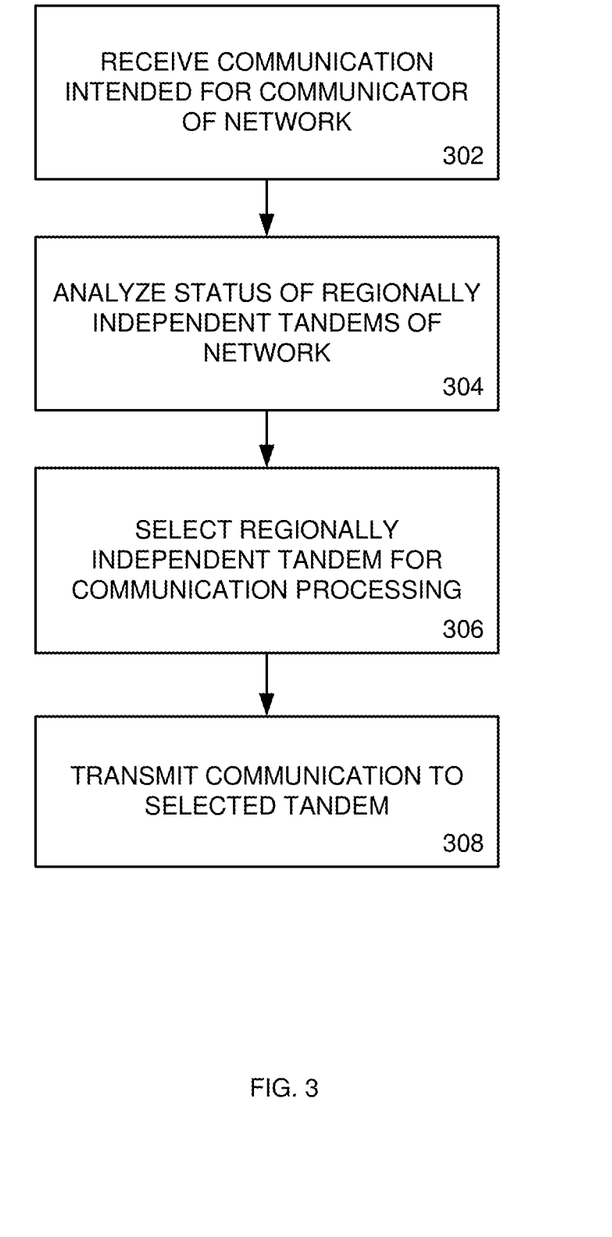
FIG. 3 is a flowchart of a method for a telecommunications network to process communications through one or more regionally-independent tandems associated with the network.

FIG. 3 is a flowchart of a method for a telecommunications network to process communications through one or more regionally-independent tandems associated with the network. In general, the operations of the method may be performed by the IXC 202 of the telecommunications network of FIG. 2. Alternatively, the operations may be performed by any component of the VOIP network 212 of FIG. 2. The use of the IXC in the description of the operations below is for illustrative purposes only. These devices may execute one or more computer-based programs that perform the operations described, as explained in greater detail below with reference to FIG. 4.

Beginning in operation 302, the IXC receives a communication intended for one or more communicators associated with the telecommunication network. The communication may be in any form that allows the telecommunication to process and transmit the communication through the network. For example, a identification number may be associated with the communication that identifies the originating and destination points for the communication. In general, any communication known in the art of telecommunication networks is contemplated as being received in operation 302.

In operation 304, the IXC analyzes the one or more regionally independent tandem switches connected to or otherwise associated with the IXC to determine the status of the tandems. To determine the status of the connected tandems, the IXC may send a status update transmission to each tandem and the tandems may return a status message. The tandem status may include any information about the tandem, including operability, traffic congestion and location, among others. Once received, the IXC may determine which tandems are available to process the received communication.

Continuing to operation 306, the IXC selects an available tandem to transmit the received communication for entry into the network. This selection may be performed in any manner, several of which are outlined herein. However, it should be appreciated that the IXC may use any criteria or algorithm to determine to which tandem to transmit the communication. Further, because the tandems are regionally independent, the communication may be provided to any tandem of the network for transmission to the determined recipient communicator.

In one embodiment, the IXC may first remove from consideration any tandem that is inoperable, based on the status information received in operation 304. This prevents an inoperable tandem from affecting the transmission of the communication through the network. Upon removal from consideration of the inoperable tandems, the IXC may then transmit the communication to one of the operable tandems.

In one embodiment, the IXC transmits communications to the tandems sequentially or in a "round robin" fashion, beginning with a first tandem. Thus, a first received communication is transmitted to a first tandem, a second received communication is transmitted to a second tandem and so on. The terms "first tandem" and "second tandem" do not, however, indicate a particular location within the telecommunications network, but are merely labels given to the tandems to indicate an order established by the IXC. In practice, any tandem of the network may be the "first tandem" or the "second tandem".

In another embodiment, the IXC may perform a load balancing determination based on the status information received in operation 304. In this embodiment, the IXC analyzes the traffic or number of communications being processed by some or all of the tandems of the network to determine the relative processing availability of the tandems. Then, based on this analysis, the IXC transmits the communication to one of the analyzed tandems. In some cases, the IXC transmits the communication to the tandem with the least amount of traffic to maximize the processing speed of the tandems. However, the IXC may transmit the communication to any tandem based on the traffic analysis.

In yet another embodiment, the IXC may transmit the communication to a tandem that is physically located near the destination communicator. For example, a tandem of the telecommunications network may be physically located Chicago, Ill. This location may be known by the IXC based on the status information received in operation 304. Further, the IXC may analyze the communication to determine the location of the destination communicator. In this example, the destination communicator is located in Minneapolis, Minn. Based on this information, the IXC transmits the communication to the tandem located in Chicago for processing, since Chicago is geographically near the destination communicator in relation to the other tandems of the network. However, it should be appreciated that the communication may be transmitted to any tandem of the network and would still arrive at the destination communicator.

In addition, any of the above described embodiments for selecting a tandem to transmit the received communication may be combined to select the tandem. For example, the IXC may perform load balancing between two tandems geographically located near the destination communicator. In another example, the IXC may perform load balancing on the next two tandems in the sequence to determine which tandem the communicator is transmitted. In general, the IXC may perform any known or herein described algorithm, alone or in combination, for routing the received communication to the regionally independent tandem. Once the tandem is selected in operation 306, the communication is transmitted to the selected tandem in operation 308 for processing of the communication.

As mentioned above, the operations of the method of FIG. 3 may be performed by the IXC for transmitting a long distance communication into a telecommunications network. Similarly, the operations may be performed by one or more components of the VOIP network to select a regionally independent tandem for long distance communications originating from a communicator connected to the telecommunications network. In this manner, communications arriving into or originating from the VOIP network may be processed by the regionally independent tandems connected to or otherwise associated with the telecommunications network.

Figure 4:
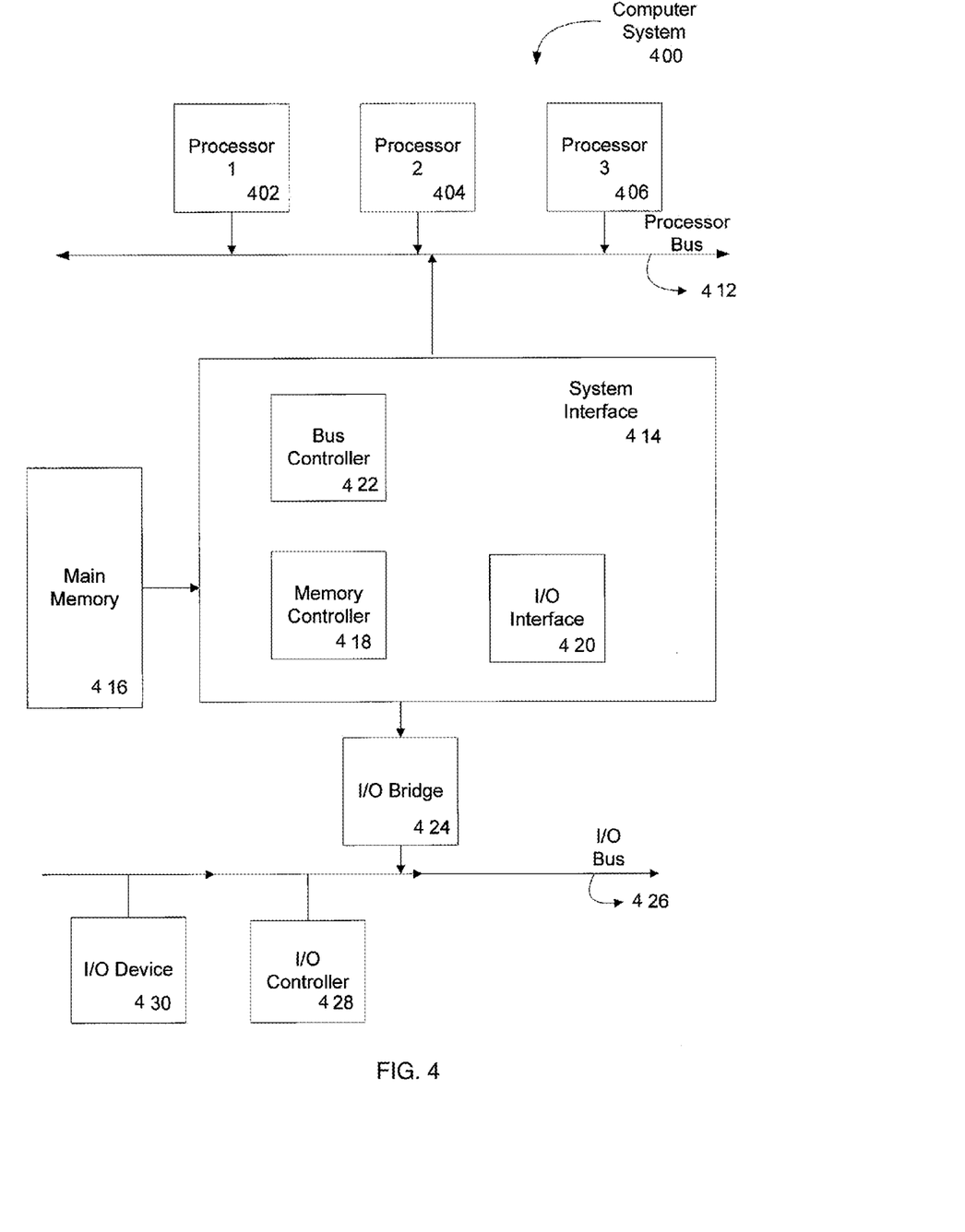
FIG. 4 is a block diagram illustrating an example of a regionally independent tandem switch or similar computer system 400 which may be used in implementing embodiments of the present disclosure.

FIG. 4 is a block diagram illustrating an example of a regionally independent tandem switch or similar computer system 400 which may be used in implementing embodiments of the present disclosure. The tandem switch or computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 418 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowcharts of FIG. 3 is illustrative only. Alternative embodiments of the present invention may add operations, omit operations, or change the order of operations without affecting the spirit and scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for transmitting a long distance communication on a telecommunications network, the method comprising:

by an interexchange carrier (IXC):

receiving a long distance communication originating from a communication device associated with the telecommunications network;

sending status update transmissions to a plurality of regionally independent tandem switches communicably connected to the telecommunications network, wherein the plurality of regionally independent tandem switches are configured to route calls to a plurality of regions associated with a voice over IP (VoIP) network and are configured to receive and process long distance communications transmitted on the voice over IP network;

in response to the sending of the status update transmissions, receiving a status message from at least one of the plurality of regionally independent tandem switches, wherein the status message comprises operational information about the at least one of the plurality of regionally independent tandem switches;

performing load balancing among the plurality of regionally independent tandem switches by selecting a regionally independent tandem switch of the plurality of regionally independent tandem switches to route the long distance communication based on the received status message, wherein the received status message indicates at least a load of the at least one of the plurality of regionally independent tandem switches; and routing the long distance communication to the selected regionally independent tandem switch.

2. The method of claim 1, wherein the received status message indicates a number of communications processed by the at least one of the plurality of regionally independent tandem switches.

3. The method of claim 1, wherein the received status message indicates a physical location of the at least one of the plurality of regionally independent tandem switches.

4. The method of claim 3, wherein load balancing is performed on a subset of the plurality of regionally independent tandem switches based on physical locations of the regionally independent tandem switches in the subset.

5. The method of claim 1, wherein selecting a regionally independent tandem switch of the plurality of regionally independent tandem switches to route the long distance communication based on the received status message comprises:

based on a received status message from a first regionally independent tandem switch of the plurality of tandem switches, determining a load of the first regionally independent tandem switch;

based on a received status message from a second regionally independent tandem switch of the plurality of tandem switches, determining a load of the second regionally independent tandem switch;

comparing the load of the first regionally independent tandem switch to the load of the second regionally independent tandem switch;

performing at least one of:

selecting the first regionally independent tandem switch to route the long distance communication when the load of the first regionally independent tandem switch is less than the load of the second regionally independent tandem switch; and selecting the second regionally independent tandem switch to route the long distance communication when the load of the second regionally independent tandem switch is less than the load of the first regionally independent tandem switch.

6. A network comprising:

a plurality of routers operable to transmit long distance communications across the network, wherein at least one of the plurality of routers is communicably connected to a plurality of regionally independent tandem switches, the plurality of regionally independent tandem switches being associated with a voice over IP (VoIP) network and configured to receive and process long distance communications transmitted on the voice over IP network, wherein the at least one of the plurality of routers is configured to performed the steps of:

receiving a long distance communication originating from a communication device associated with the network;

sending status update transmissions to the plurality of regionally independent tandem switches;

in response to the sending of the status update transmissions, receiving a status message from at least one of the plurality of regionally independent tandem switches, wherein the status message comprises operational information about the at least one of the plurality of regionally independent tandem switches;

performing load balancing among the plurality of regionally independent tandem switches by selecting a regionally independent tandem switch of the plurality of regionally independent tandem switches to route the long distance communication based on the received status message, wherein the received status message indicates at least a load of the at least one of the plurality of regionally independent tandem switches; and routing the long distance communication to the selected regionally independent tandem switch.

7. The network of claim 6, wherein the received status message indicates a number of communications processed by the at least one of the plurality of regionally independent tandem switches.

8. The network of claim 6, wherein the received status message indicates a physical location of the at least one of the plurality of regionally independent tandem switches.

9. The network of claim 8, wherein load balancing is performed on a subset of the plurality of regionally independent tandem switches based on physical locations of the regionally independent tandem switches in the subset.

10. The network of claim 6, wherein selecting a regionally independent tandem switch of the plurality of regionally independent tandem switches to route the long distance communication based on the received status message comprises:

based on a received status message from a first regionally independent tandem switch of the plurality of tandem switches, determining a load of the first regionally independent tandem switch;

based on a received status message from a second regionally independent tandem switch of the plurality of tandem switches, determining a load of the second regionally independent tandem switch;

comparing the load of the first regionally independent tandem switch to the load of the second regionally independent tandem switch;

performing at least one of:

selecting the first regionally independent tandem switch to route the long distance communication when the load of the first regionally independent tandem switch is less than the load of the second regionally independent tandem switch; and selecting the second regionally independent tandem switch to route the long distance communication when the load of the second regionally independent tandem switch is less than the load of the first regionally independent tandem switch.

* * * * *